Figure 1:
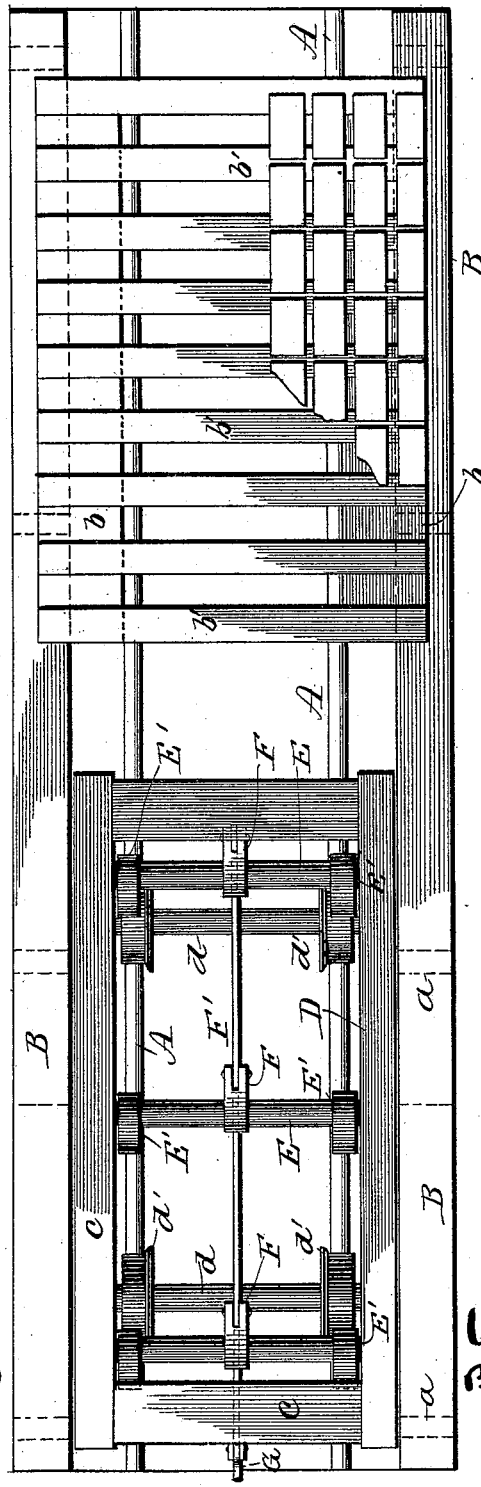

(No Model.) 2 Sheets—Sheet 1.

W. GRIFFITH.
DEVICE FOR CONVEYING BRICKS.

No. 472,922. Patented Apr. 12, 1892.

(No Model.) 2 Sheets—Sheet 2.

W. GRIFFITH.
DEVICE FOR CONVEYING BRICKS.

No. 472,922. Patented Apr. 12, 1892.

Witnesses
Inventor
Wm Griffith
Attorney

UNITED STATES PATENT OFFICE.

WILLIAM GRIFFITH, OF PITTSTON, PENNSYLVANIA.

DEVICE FOR CONVEYING BRICKS.

SPECIFICATION forming part of Letters Patent No. 472,922, dated April 12, 1892.

Application filed June 23, 1891. Serial No. 397,192. (No model.)

*To all whom it may concern:*

Be it known that I, WILLIAM GRIFFITH, a citizen of Pittston, in the county of Luzerne and State of Pennsylvania, have invented certain new and useful Improvements in Devices for Conveying and Drying Bricks; and I do hereby declare the following to be a full, clear, and exact description of the invention, such as will enable others skilled in the art to which it appertains to make and use the same.

My invention relates to an improvement in devices for conveying bricks and supporting them while drying.

In the modern manufacture of bricks there are two general methods of handling used. The bricks after being molded either by hand or by machinery are placed upon wheelbarrows or hand-trucks and conveyed to the drying-ground. Again, it has been proposed to employ a system of railroad-tracks leading from the brick-machine to an artificial brick-drying room, where artificial heat is applied to dry the bricks, and in many cases steam-heat is used.

The process formerly employed is as follows: The bricks are taken from the machine and loaded upon a car or truck—say four hundred bricks to each car—and this carload of bricks is then pushed into the drying-room and allowed to remain there to dry, and as each car holds only four hundred bricks as many cars are required as will suffice to hold one or two days' output of bricks. For example, if the capacity of the machine or drier is twenty thousand bricks per day and each car holds four hundred bricks fifty cars will be necessary, and if the bricks have to remain longer than twenty-four hours in the drier fifty additional cars will be required for every twenty-four hours, so that about eighty or one hundred or more cars are usually required for a plant of the above capacity.

The object of my present improvements is to avoid the use of so many cars, thus reducing the expense of the plant and to handle the same quantity of bricks with only two or three cars.

A further object is to provide a car for conveying bricks and means for supporting the bricks while being dried and to construct said car in such manner that the load of bricks will be supported and carried in an elevated position during the travel of the car without liability of the load of bricks being lowered at an improper time.

A further object is to provide a movable platform for a brick truck or car and to provide means whereby said platform may be raised or lowered, said devices being applicable to an ordinary car now in use.

A further object is to provide means for conveying and drying bricks, said devices being so constructed and arranged that a large number of loads of brick may be supported at once and be placed thereon close together with the use of a small number of cars.

With these objects in view the invention consists in certain novel features of construction and combinations and arrangements of parts, as hereinafter set forth, and pointed out in the claims.

Figure 2:
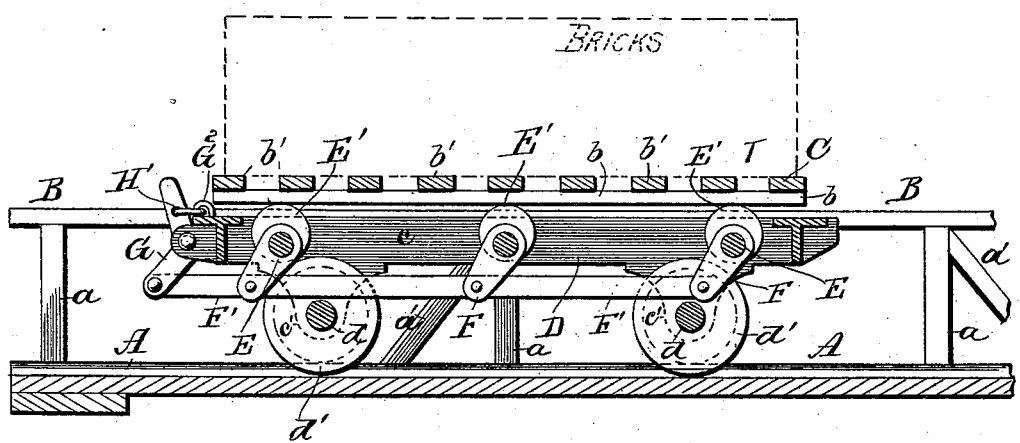
Figure 3:
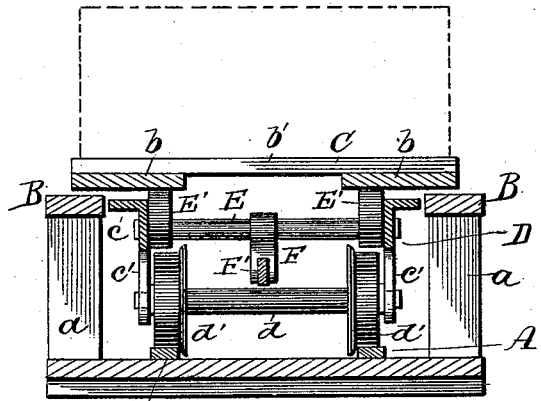

In the accompanying drawings, Figure 1 is a plan view of my improved car and supporting devices. Figs. 2 and 3 are sectional views of the same.

A represents a trackway, at each side of which a rail or support B is located, said rails or supports being supported by posts *a*, arranged comparatively close together, and said posts being sustained upright by means of braces *a'*. A pallet or platform C, composed of side bars *b* and slats *b'*, is adapted to bridge and rest upon the rails or supports B, said platform being adapted to support a load of bricks. The platform C, having the load of bricks thereon, is adapted to be carried from the brick-machine to the point desired on the rails B by means of a specially-constructed car D, adapted to run on the rails or tracks A and between the rails or supports B. The car D comprises a rectangular frame *c*, having hangers *c'* depending therefrom, in which axles *d* are mounted, said axles having wheels *d'*. The axles *d* may be fixed in the hangers and the wheels loosely mounted thereon, or the wheels may be fixed to the axles and the axle mounted to revolve in their bearings. Journaled in the side bars of the rectangular frame of the car is a series of shafts E, each shaft being provided in proximity to its ends with eccentrics E'. These eccentrics are so formed that after the platform C containing the load of bricks is placed on the car and the shafts E turned the platform and its load will be elevated so as to be free from the supports or rails B and be maintained in that position until the shafts are again turned. Thus it will be seen that after a car has been loaded at the brick-machine it is wheeled to the farthest extremity of the track, and by rotating the shafts E the platform C and its load will thereby be lowered and made to rest on the rails or supports B, after which the car can be readily run from beneath it and carried back to the brick-machine ready for another load to be conveyed to the drying-ground in the same manner.

In order to provide means whereby all the shafts may be rotated simultaneously, each shaft E will be provided with a downwardly-projecting crank-arm F, each bifurcated at its lower end for the reception of a common operating-bar, which is pivotally connected thereto and which extends longitudinally of the car. At one end the bar F' is pivotally connected to one arm of a lever G, which latter is pivotally connected to a suitable bracket on the cross-bar of the car-frame. By this means all the eccentrics may be operated simultaneously to raise or lower the platform D and its load.

To avoid any liability whatever of the shafts E turning at an improper time and thus improperly lowering the platform D, the upper arm of the lever G may be provided with a hook H', adapted to engage a hook or eye $G^2$ on the car-frame.

The devices constructed and arranged as above set forth are very simple and effectual in the performance of their functions.

Having fully described my invention, what I claim as new, and desire to secure by Letters Patent, is—

1. The combination, with a car-frame, of eccentric mechanism supported therein, means for rocking this mechanism independent of any movement of the car-frame, and a platform located above the frame where it is raised and lowered by the rocking of the eccentric mechanism, substantially as set forth.

2. The combination, with a car-frame, of rocking shafts supported in said frame, said shafts having eccentrics thereon, and a platform located over the car-frame in position where it is raised and lowered by the rocking of the shafts and their eccentrics, substantially as set forth.

In testimony whereof I have signed this specification in the presence of two subscribing witnesses.

WM. GRIFFITH.

Witnesses:
  WALTER WEBSTER,
  T. R. HUGHES.